Jan. 10, 1939.     E. F. MARTINET     2,143,202
FOOD PREPARER
Original Filed Oct. 6, 1933     2 Sheets-Sheet 1

Inventor
Eugene F. Martinet
By Frease and Bishop
Attorneys

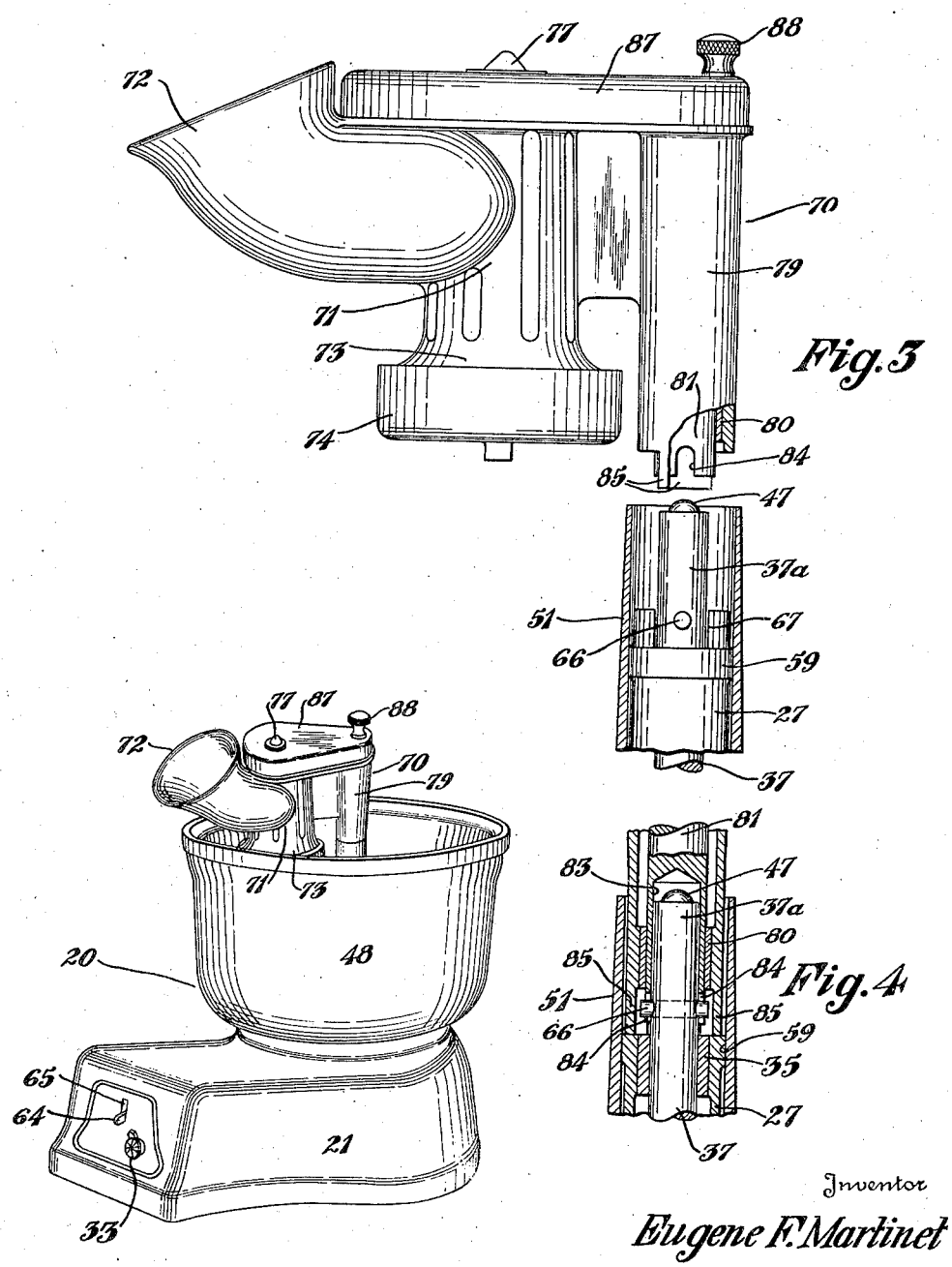

Patented Jan. 10, 1939

2,143,202

UNITED STATES PATENT OFFICE 2,143,202

FOOD PREPARER

Eugene F. Martinet, Cleveland, Ohio, assignor to The P. A. Geier Company, Cleveland, Ohio, a corporation of Ohio Original application October 6, 1933, Serial No. 692,483. Divided and this application October 13, 1936, Serial No. 105,373

6 Claims. (Cl. 146—192)

The invention relates to food preparing devices or appliances for grinding, chopping or pureeing foods and foodstuffs, and more particularly to a food grinding device of a type having the operating mechanism housed in a base, a food receiving bowl mounted on the base, and the food grinding elements detachably mounted above the bowl and detachably connected with the operating mechanism through a central tubular sleeve with which the bowl is provided; and this application is a division of my copending application Serial No. 692,483, entitled Food preparers, filed October 6, 1933 which became Patent No. 2,063,692 on December 8, 1936.

Prior food preparers of this type have either been limited in use for one purpose only, or have given rise to difficulties so numerous as to render them impractical.

It is therefore an object of the present invention to provide an improved food grinding device which overcomes the difficulties encountered with prior devices of this type, in which the food grinding elements are mounted for quick operative attachment or detachment above the bowl in the same manner as numerous other food preparing elements, without the use of bolts, screws, or other special fastening and mounting means such as adapters, supports, connectors, reduction gears and the like.

Another object is to provide an improved food grinding device in which all the oil and grease for lubricating the driving mechanism is at all times kept below the food receiving bowl, so as to render it impossible for oil or grease to drop into or become mixed with food therein.

A further object is to provide an improved food grinding device which has a very low center of gravity located either within or below the food receiving bowl thereof, so that the device is not top-heavy and will not tip over during use.

A still further object is to provide an improved food grinding device which is rigid, compact and simplified in construction and in which a multiple speed motor is utilized for driving the grinding elements at proper speeds, which motor is adapted for driving various other food preparing elements at proper speeds for carrying out their respective operations.

It is likewise an object of the present invention to provide an improved food grinding device in which there are no cavities, crevices, pockets and the like, where food particles may accidentally enter or collect to render the device unsanitary or affect the operation of the driving or driven parts or mechanism thereof.

These and other objects may be attained by the parts, elements, apparatus, devices, arrangements and combinations, preferred embodiments of which are shown in the drawings, and are hereinafter described in detail and claimed, which may be stated in general terms as including a food grinding device having a base housing provided with a sleeve projecting upwardly from and through the base, a multiple speed motor mounted within the base housing and operatively connected to a drive shaft journaled in said sleeve, a food receiving bowl having a central tubular sleeve journaled on said housing sleeve, and a food grinder detachably mounted on the upper end of said housing sleeve and having a detachable clutch engagement with said drive shaft.

In the drawings—

Fig. 2 is a perspective view thereof on a reduced scale;

Fig. 3 is a fragmentary expanded view of the food grinding elements and the upper portions of the bowl sleeve and drive shaft in position to receive the driven parts of the grinder mechanism; and Fig. 4 is a fragmentary sectional view taken on line 4—4, Fig. 1.

Similar numerals refer to similar parts throughout the drawings.

Figure 1:
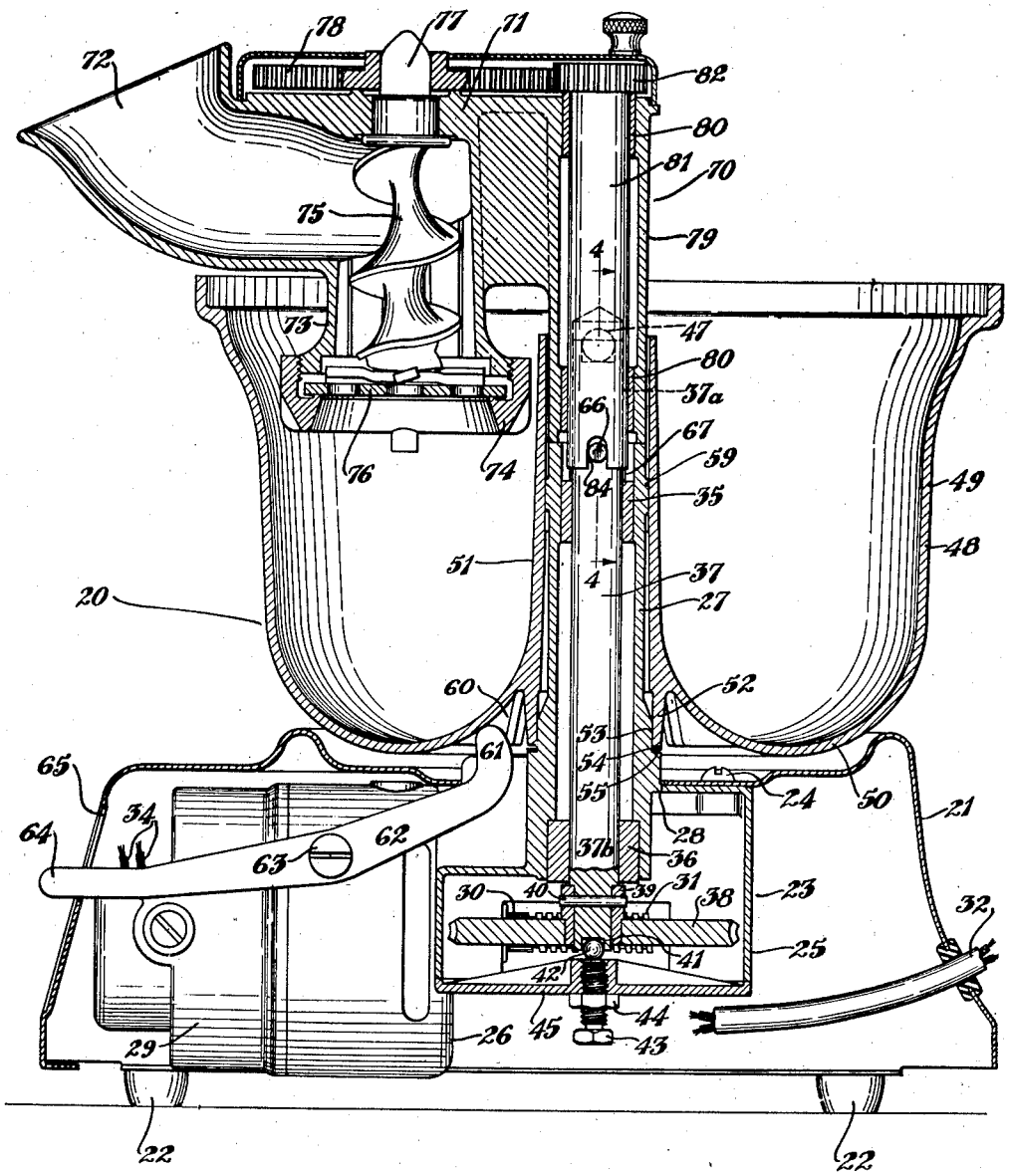
Figure 1 is a vertical sectional view of the improved food grinding device in operative position.

The improved food grinding device is indicated generally at 20 and includes a base 21, preferably provided with rubber feet 22 for supporting the improved device upon a table or other convenient place of use. A housing indicated generally at 23 is connected to the base by screws 24, and the housing 23 preferably comprises an integral casting which includes the gear case portion 25, the motor housing portion 26 and the sleeve member 27. The member 27 projects vertically upward from the gear case portion 25 through an aperture 28 in the base 21.

The motor housing portion 26 has a motor end cap 29 attached thereto, and a multiple speed motor is mounted within the motor housing and cap 26—29, the motor shaft 30 thereof being provided with worm threads 31.

The food grinding device 20 is provided with suitable wiring 32, having a usual plug (not shown) for being attached to any suitable source of electric power; and the wiring 32 may lead to a control switch, the operating member 33 of which is shown in Fig. 2, from which switch suitable wires 34 may lead to the motor within the motor housing 26—29. The motor and switch constructions are of a usual type and therefore are not illustrated in detail.

Oilless bearings 35 and 36 are mounted within and adjacent to the extremities of sleeve 27, and a worm gear shaft 37 is journaled in said bearings 35 and 36, the upper end 37a of shaft 37 projecting upward beyond the end of the sleeve 27, and the lower end 37b of said shaft projecting into the gear case portion 25 of the integral housing 23.

A preferably linen micarta worm gear 38 meshes with the worm 31 and is provided with a hub 39 and mounted by a pin 40 on the lower end 37b of the worm gear shaft 37.

The lower end 37b of the shaft 37 is also provided with an axial recess 41 in which is located a ball bearing 42 that is held in position by peening over the edge of the recess after the ball has been inserted therein. An adjusting screw 43 located directly below the ball 42 and axially of the shaft 37, is provided with a lock nut 44 and is threaded through the removable gear case cover 45; and the screw 43 provides means for receiving the downward axial thrust of the shaft 37 and for adjustably locating the shaft 37 in the proper position.

The gear case 25 may be filled with grease and since the bearings 35 and 36 are oilless bearings, all grease and lubricant for the motivating parts of the improved food grinder are located below the top of and within the base 21.

By providing the integral housing 23, which includes in one piece the gear case 25, the motor case 26 and the sleeve 27, the parts thus far described may be readily machined and assembled in their proper and correct relation without play between parts; and great rigidity is imparted to the motivating parts of the device. Moreover, the bearings 35 and 36 in both being rigidly mounted in the sleeve 27, may be readily located in axial alignment so that the shaft 37 driven by the motor will always run true on center.

The upper end 37a of the shaft 37 may be also provided with an axial recess in which is located a ball bearing 47 for providing a thrust abutment with certain food preparing elements, if it is desired to remove the grinder elements and attach other food processing elements.

A food receiving bowl 48 having an outer annular wall 49 which merges into the bottom wall 50 terminating inwardly and upwardly in a vertically extending central tubular sleeve 51, is telescoped over the sleeve 27 as best shown in Fig. 1.

The bowl 48 is also provided with a downwardly extending collar 52, which is substantially in continuation of its central sleeve and the collar 52 is journaled about the external circumferential bearing portion 53 of the sleeve 27, while the lower end of the collar 52 preferably bears on a split anti-friction thrust ring 54 interposed between the collar 52 and the annular step 55 of the sleeve 27.

The sleeve 27 is also provided with an external annular upper bearing surface 59 spaced from the bearing portion 53 and above the base 21, and journaled in the bowl sleeve 51 which is telescoped thereover and removably rotatably mounted thereon.

The food receiving bowl 48 is preferably provided with a series of radial ribs or ears 60 extending inward from the curved bottom wall 50 toward the collar 52 for selective engagement with the inner end 61 of the bowl locking lever 62, which is pivoted at 63 to the motor housing 26, the outer operating end 64 of the lever projecting outward through a slot 65 in the base 21, as best shown in Figs. 1 and 2. With the lever 62 in the position shown in Figs. 1 and 2 of the drawings, the bowl 48 is held against rotation.

The upper end 37a of the shaft 37 is provided with a diametrically disposed driving pin 66, and the upper end of the sleeve 27 is notched out at diametrically disposed places indicated at 67 for a purpose to be described.

The improved food grinding or chopping elements are indicated generally at 70 and include a grinder body 71 having a food hopper 72 and the extrusion portion 73 provided with the squeezer head 74 located below the top of the bowl sleeve 51. An auger 75 is rotatably mounted in the extrusion portion 73 for forcing food through an extrusion die 76 into the bowl 48, and the upper end 77 of the auger shaft is provided with a gear 78.

Cast integrally with the grinder body 71 is a sleeve portion 79 laterally offset from extrusion portion 73 and provided with bearing portions 80 in which a sleeve shaft 81 is journaled. The upper end of sleeve shaft 81 is provided with a spur gear 82 meshing with gear 78, and the lower end is provided with an internal bore 83 which telescopes over the upper end 37a of the drive shaft 37, diametrically disposed notches 84 being provided in the lower end of sleeve shaft 81 for engagement with the ends of the drive pin 66.

The lower end of the outer sleeve portions 79 is provided with diametrically opposite depending lugs 85 for being received in the notches 67 of the base housing sleeve 27, to hold the grinder body 71 against rotation, the outer diameter of sleeve portion 79 being adapted to fit within the bowl sleeve 51. Thus when the grinder is operatively connected to the drive shaft 37 by engaging the ends of pin 66 in the notches 84, the lower end of the outer sleeve portion 79 is carried on and prevented from rotating by the upper end of sleeve 27.

The gears 78 and 82 are preferably enclosed by a cover plate 87 held in place by a thumb screw 88, which may also be utilized as a handle for positioning the grinder 70 in place on the upper end 37a of the drive shaft.

In operating the improved grinder, the bowl 48 is positioned as shown in Fig. 1 with its sleeve 51 telescoped over base housing sleeve 27, and the grinder 70 is placed with its sleeve shaft 81 telescoped over and in driving engagement with the upper end 37a of the shaft 37, whereby operation of the drive shaft by the motor shaft 30 drives the auger 75 to chop or grind food introduced in the hopper 72, and extrude the same through the squeezer head 74 into the food receiving bowl 48. The food receiving bowl 48 may be locked by lever 62 as shown, or may be allowed to rotate as desired, while the entire load of the food grinder is carried directly on the base housing sleeve 27.

In the present improved apparatus, the grinding elements indicated generally at 70 may be quickly attached to or detached from the drive shaft above the bowl without the use of bolts, screws, or other special fastening and mounting means such as adapters, supports, connectors, reduction gears and the like; and if desired, the grinding elements may be detached and other food processing elements attached and mounted in the same manner.

Due to the fact that the driving mechanism is housed in the base housing and housing sleeve, all oil and grease necessary for lubricating the driving mechanism is at all times kept below the food receiving bowl, so as to render it impossible for oil or grease to drop into or become mixed with food therein; and the center of gravity of the device is located either within or below the food receiving bowl, so that even with the relatively heavy food ginder operatively mounted thereon, the device is not top-heavy and will not tip over during use.

Moreover, when the food grinder is operatively mounted above the food receiving bowl, the extrusion head 74 is spaced below the top of the bowl and extends well into the same, while the hopper 72 is located just above the bowl or very closely adjacent to the top of the bowl. By thus providing for mounting the grinder as low as possible, the center of gravity of the device is not raised materially, and the tendency toward tipping is not increased.

The improved food grinding device is rigid, compact and simplified in construction, and overcomes all of the difficulties encountered with prior devices of this type. Moreover, the improved food grinding device has no cavities, crevices, pockets and the like where food particles may accidentally enter or collect to render the device unsanitary or affect the operation of the driving or driven parts or mechanism thereof.

I claim:—

1. In a food preparing device having a vertical drive shaft with clutch parts on the upper end thereof; a food grinder including a body member having a hopper inlet, a downwardly discharging extrusion portion, a squeezer head, and a laterally offset vertical sleeve portion; a sleeve shaft journaled in said vertical sleeve portion removably telescoped over the upper end of said drive shaft and having clutch parts for releasable engagement with said drive shaft clutch parts; a grinder screw shaft in said extrusion portion; and means operatively connecting said sleeve shaft and said grinder screw shaft.

2. A food grinding device including a base housing having an upwardly extending sleeve, a drive shaft in said sleeve having driving connection means at its upper end, a downwardly discharging food grinder having a body member and a laterally offset sleeve portion, and a sleeve shaft journaled in said sleeve portion and detachably telescoped over the upper end of said drive shaft for operative connection with said driving connection means, said grinder sleeve portion being supported on and prevented from rotation by said base housing sleeve.

3. A food grinding device including a base housing having an upwardly extending sleeve, a drive shaft in said sleeve having driving connection means at its upper end, a downwardly discharging food grinder having a body member and a laterally offset sleeve portion, and a sleeve shaft journaled in said sleeve portion and detachably telescoped over the upper end of said drive shaft for operative connection with said driving connection means, there being interengaging means on said base housing sleeve and said grinder sleeve portion for preventing rotation of the food grinder.

4. A food grinding device including a base housing having an upwardly extending sleeve, a drive shaft journaled in said sleeve and having driving connection means at its upper end, a food receiving bowl having an upwardly extending sleeve telescoped over said housing sleeve, a food grinder having a sleeve portion, a shaft journaled in said sleeve portion and detachably telescoped over the drive shaft for operative connection with the driving connection means, the lower end of said grinder sleeve portion being telescoped within the upper end of said bowl sleeve and supported on the upper end of said base housing sleeve.

5. A food grinding device including a base housing having an upwardly extending sleeve, a drive shaft journaled in said sleeve, driving mechanism in said base housing operatively connected to said drive shaft, a food receiving bowl having an upwardly extending sleeve telescoped over said housing sleeve, a food grinder having a hopper inlet and an extrusion head, said food grinder being provided with a sleeve shaft telescoped within the bowl sleeve for making operative connection with the upper end of the drive shaft, said extrusion head being spaced below the top of said bowl and extending into said bowl, and said hopper inlet being closely adjacent to the top of said bowl.

6. A food grinding device including a base housing having an upwardly extending sleeve, a drive shaft journaled in said sleeve and having driving connection means at its upper end, a food receiving bowl having an upwardly extending sleeve telescoped over said housing sleeve, a food grinder having a sleeve portion, a laterally offset extrusion head extending into said bowl below the top of said bowl sleeve, a shaft journaled in said sleeve portion and detachably telescoped over the drive shaft for operative connection with the driving connection means, the lower end of said grinder sleeve portion being telescoped within the upper end of said bowl sleeve and supported on the upper end of said base housing sleeve.

EUGENE F. MARTINET.